Dec. 5, 1950 W. C. HASSELHORN 2,532,448
BELLOWS
Filed March 22, 1945 2 Sheets-Sheet 1
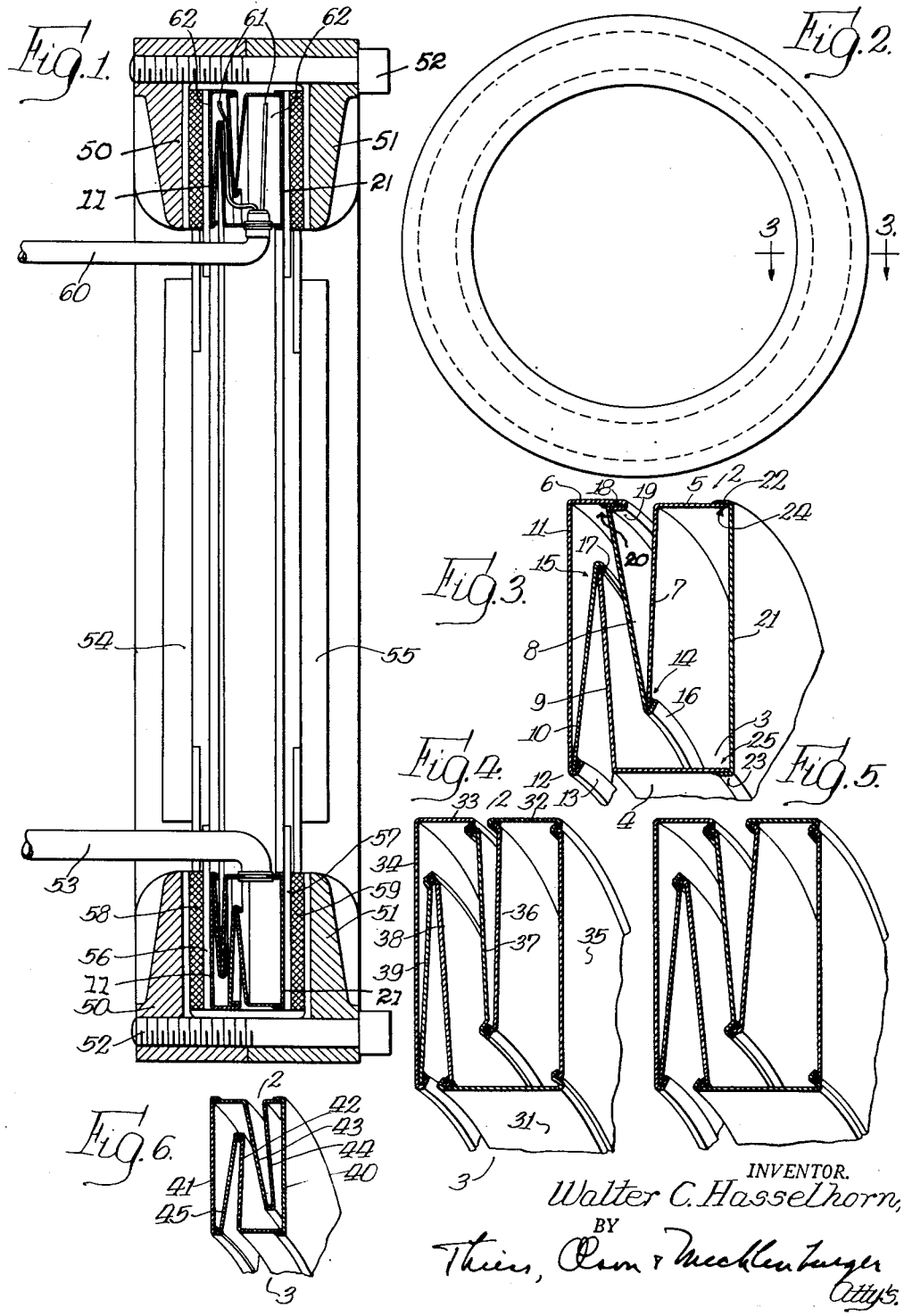
INVENTOR.
Walter C. Hasselhorn,
BY
Thiess, Olsen & Mecklenburger
Attys.

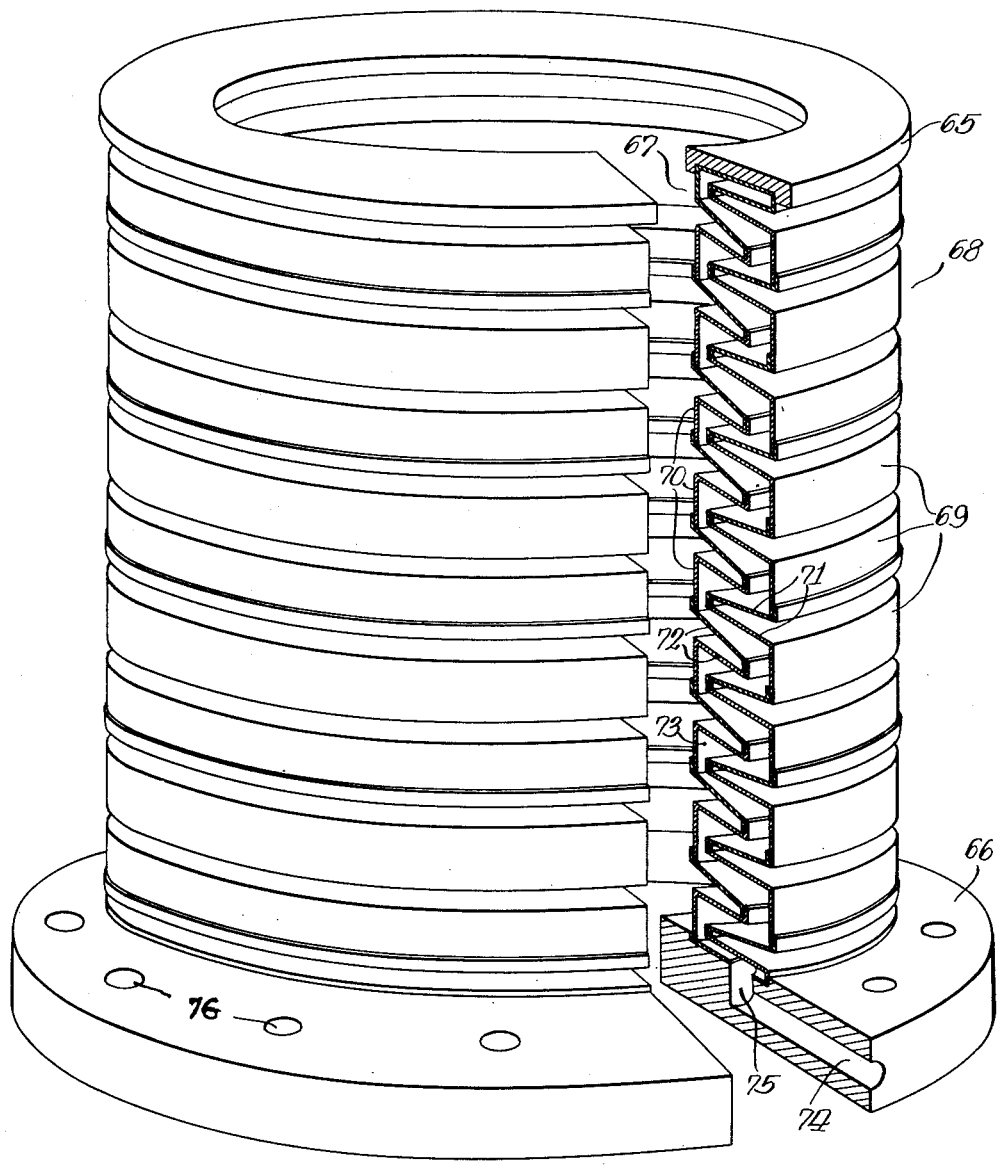

Patented Dec. 5, 1950

2,532,448

UNITED STATES PATENT OFFICE 2,532,448

BELLOWS

Walter C. Hasselhorn, Chicago, Ill., assignor to Cook Electric Company, Chicago, Ill., a corporation of Illinois Application March 22, 1945, Serial No. 584,047

6 Claims. (Cl. 137—156.5)

1

This invention relates to flexible metal walls for collapsible and expansible vessels and more particularly to the type of vessel known as bellows.

The invention is particularly directed to an improved construction providing for uniform axial expansion of an annular or doughnut shape bellows.

The invention in one of its broader aspects is directed to the making of a bellows of doughnut shape.

As heretofore constructed, bellows have been limited in design to cylindrical bodies having the interior either as an open or a closed chamber. In certain instances, the bellows have formed the interior wall of a pressure unit and the pressure has been applied exteriorly to collapse the bellows upon an increase of pressure. Thus the pressure chamber extended across and closed off one end of the bellows. The wall movable by the action of the bellows was therefore disposed within the unit itself and the work arm projected centrally through the open end to transmit motion. The arrangement inherently prevented transmittal of force axially by a relatively flat annular face.

The invention herein disclosed is concerned with overcoming the aforesaid limitations in bellows design and providing a new type of bellows. This new type of bellows is designed to transmit force by a substantially flat annular ring like surface. This transmission of force is preferably uniform axially over the entire surface of the flat annular ring to secure uniform application of the force.

More specifically, the invention may include a bellows comprising spaced annular walls defining an annular chamber, the walls being constructed of sectional parts having flexible portions, and, in the specific embodiment of the invention illustrated herein, these sectional parts may extend inwardly or outwardly of the plane of said walls whereby both walls may be axially flexed and the concentricity between the same maintained during the flexing.

Accordingly, it is an object of the invention to provide a new and improved type of bellows capable of performing work in various adaptations that did not admit of the use of bellows heretofore.

The inventive idea involved is capable of embodiment in a variety of ways, and, for the purposes of illustration, several of these embodiments are specifically described and shown in the accompanying drawings, in which:

2

Figure 1 is a cross sectional view illustrating one of the various possible adaptations of a bellows embodying the present invention;

Figure 2 is an end view of this bellows;

Fig. 3 is an enlarged sectional view taken on line 3—3 of Fig. 2;

Fig. 4 is a similar view illustrating a different form of end connections at the points of adjacent sections;

Fig. 5 is the same structure as shown in Fig. 4 but in expanded position;

Fig. 6 illustrates a further modified form of structure; and

Fig. 7 is a perspective view, with a portion in section, of a completed bellows unit with end plates attached at both ends and illustrating how the capacity may be readily varied.

As stated, Fig. 1 illustrates one of the adaptations of a bellows embodying the invention. Any one of the bellows structures shown in Figs. 1, 3, 4 or 6, or equivalent structures, may be used.

The bellows unit comprises two concentric walls 2 and 3 consisting of sectional parts including concentrically spaced annular wall members 4, 5 and 6 and members 7, 8, 9 and 10 arranged in pairs, the members of each pair preferably folding upon each other and extending out of the planes of walls 2 and 3. Quite obviously a more compact unit may be provided if the wall members 7, 8, 9 and 10 extend inwardly between wall members 4, 5 and 6, but they may also extend outwardly or in opposite directions away from the wall members 4, 5 and 6, if so desired.

The manner in which the folding wall members are formed with respect to annular wall members 4, 5 and 6 may vary. In Fig. 3, folding wall members 7 and 8 extend from the outside concentric wall 2 comprising members 5 and 6 and the parts 9 and 10 extend from the inside concentric wall 3 comprising member 4. To illustrate, part 7 may be integrally formed with its connecting wall member 5, while part 8 may be separately formed and secured to its connecting wall member 6. Likewise, part 9 may be integrally formed with its connecting wall member 4 while part 10 may be separately formed and secured to a bottom wall 11 by a joint 12 which may be formed in part by a flange 13 on bottom wall 11. Parts 7 and 8, as well as parts 9 and 10, may be connected together at their inner ends by suitable joints 14 and 15, as by flanging the edges of parts 8 and 10 at 16 and 17 to lap over the edges of parts 7 and 9. The opposite edge of part 8 may have an upturned flange 18 over which a flange 19 on the adjacent connecting wall member 6 is crimped to form joint 20. Bottom wall 11 may be integrally formed with wall member 6, or it may be separately formed as in the case of a top wall 21. Top wall 21 is provided with overlapping down turned flanges 22 and 23 about its outer and inner peripheries, which flanges are adapted to lie over the edges of wall members 4 and 5. Joints 24 and 25 formed by down turned flanges 22 and 23 may be substantially the same as the other joints.

The manner in which these joints are finished may vary considerably. This will depend upon the internal pressure to be used, the material of the parts and the work to be performed by the unit. After these parts are assembled as explained, solder may be flowed into the joints to fgorm a hermetical seal. If the finished unit is to be subjected to heavy duty work or to relatively high temperatures, these joints may be brazed, or even welded.

In Figs. 4 and 5, substantially the same structure is shown, but with flanges formed at the edges of certain of the sectional parts and gutters in the edges of cooperating parts to receive the flanges, either in soldered or brazed relation. Preferably the soldered is flowed into the gutters, which may or may not be of V formation, and the flanges are extended into the gutter and are embedded in the solder. A further change may be in making each of the folding parts separately and not integral with the parts of walls 2 and 3. For example, annular members 31, 32 and 33 are each formed with gutters about their edges except member 33 which has bottom member 34 bent therefrom, the gutter being on the edge of this bottom member. Top member 35 and the folding member 36 has both edges flanged for cooperation in the gutters of annular members 31 and 32 and in gutters of the cooperating folding member 37. Folding member 38 has both edges flanged for cooperation in the gutters of annular member 31 and the cooperating folding member 39.

Further changes may be made not only in the joint formation, but also in the relation of the annular wall members and the folding members. This will be apparent from an inspection of Fig. 6, wherein both top and bottom walls 40 and 41 are separately formed and are flanged to form a desirable joint with adjacent sectional parts of the concentric walls 2 and 3. Folding sections 42, 43 and 44 are each formed as a part of the adjacent sectional part of the annular concentric wall members, while folding member 45 is separately formed. Further variations are quite obviously possible.

As previously stated, Fig. 1 illustrates an application of the bellows unit disclosed herein. For the purposes of illustration only, the form of bellows shown in Fig. 3 is employed. This bellows unit is disposed between wheel parts 50 and 51 secured together by rim bolts 52. Irrespective of the exact details of construction which may be changed to suit the installation, the bellows will have a pressure transmitting fluid connection 53 communicating with the interior thereof and leading to any suitable control for varying the pressure. When it is desired to apply a braking effect against the rotating parts 54 and 55, fluid will be forced through connections 53 into the bellows to expand the same. The transmission of the pressure is thus preferably uniform axially over the entire surface of the bottom and top walls 11 and 21 and is thus applied to force the brake members 56 and 57 against cooperating brake members 58 and 59 carried by the rotating parts 54 and 55.

It will be observed that this application of force through the increase of fluid pressure in the bellows is uniform and direct and not subject to losses that occur due to wear. The constructional features of the unit permit the adaptation of the bellows to uses of this kind where parts like members 54 and 55 will not permit the use of bellows unit as heretofore constructed having at least one end completely closed. It will also be noted that the bellows unit disclosed herein will maintain a constant inside and outside diameter upon expansion and contraction due to the manner in which the spaced concentric walls 2 and 3 are constructed, there being sectional parts that are axially disposed which do not expand or contract and which do not, therefore, flex or change their form, these parts being for example those designated 4, 5 and 6 in the form of Fig. 3. The folding members 7 and 8 provide the expansion and contraction, either by flexing so that they lie one upon another, or by flexing intermediate their ends to provide the necessary contraction and expansion to the entire unit.

Another advantage in the bellows unit shown is that trapping of air therein may be readily prevented by an arrangement shown in Fig. 1 where a connection 60 is employed with smaller pipe connection 61 extending upwardly into each of the annular pockets to allow the pressure transmitting fluid to force any trapped air out by way of said connection 60.

Fig. 7 illustrates a substantially larger unit than those shown in Figs. 1 to 6, inclusive. In lieu of employing the end walls directly to transmit the pressure, end plates 65 and 66 may be attached in any suitable manner. As shown, recesses are formed in these end plates 65 and 66 and the end walls of the unit are seated therein. The manner of forming the spaced concentric walls 67 and 68 may vary considerably, but essentially they will comprise sectional parts having portions 69 and 70 annularly formed and positioned axially or in the direction of movement of the bellows unit. Between these portions 69 and 70 are portions 71 and 72 which extend inwardly and flex when the pressure changes within the annular chamber 73. Portions 71 and 72 may be integrally formed with portions 69 and 70, or they may be formed separately and secured to portions 69 and 70 by any suitable type of joint. The overlapping type of joint may be changed as will be obvious from the forms shown in Figs. 1 to 5. Fluid may be supplied by means of passages 74 and 75 or by a pipe connection as shown in Fig. 1.

Inasmuch as parts 71 and 72 and not the parts 69 and 70 flex when the pressure changes, the diameter of the concentric walls 67 and 68 will not change. Considerable expansion can be effected without causing excessive strain upon any of the parts. Also, relatively high pressures may be produced in chamber 73 and readily transmitted at end plate 65 or at end plate 66, or at both. It will be apparent, however, that end plate 66 may be used as a base and secured or attached to a mounting as by means of bolts extending through openings 76 or by other suitable means.

From the foregoing description, it will be observed that I have disclosed a new type and construction of bellows capable of performing work not heretofore produced by prior art bellows. The spaced concentric walls, defining an intermediate annular chamber, do not in their entirety flex. Portions are preferably provided which flex so that these concentric walls will maintain their concentricity during expansion and contraction, and hence, will transmit pressure uniformly about an annular area.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. An expansible and contractible unit comprising a series of built up sectional parts defining an annular chamber, said sectional parts having portions forming axially spaced walls and angulated portions extending transversely with respect to said spaced walls and overlapping each other, said angulated portions providing for the expansion and contraction of said annular chamber.

2. An expansible and contractible unit comprising a series of built up sectional parts defining an annular chamber, said sectional parts comprising two portions, one of said portions forming spaced concentric walls extending axially with respect to said chamber and formed by axially spaced elements, the other of said portions formed by angulated elements overlapping each other and extending laterally with respect to said axially spaced elements and flexing to provide for the expansion and contraction of said annular chamber, the concentricity of the spaced walls being maintained by the flexing of said angulated elements.

3. An expansible and contractible unit comprising a series of built up sectional parts defining an annular chamber, said sectional parts having axially spaced portions forming walls extending substantially axially with respect to said chamber and angulated portions extending substantially laterally with respect to said walls and in overlapping relation with respect to each other whereby to provide for the expansion and contraction of said annular chamber.

4. An expansible and contractible unit comprising a series of built-up ring-like sectional parts defining an annular chamber, said sectional parts comprising axial wall portions and transverse portions secured to the edges of the wall portions and extending crosswise of the chamber in nested relation with each other, the adjacent inner edges of transverse sections being secured together, the said axial portions forming the inner and outer walls of the unit and said transverse portions flexing to permit the axial movement of the wall portions in the expansion and contraction of the unit.

5. An expansible and contractible unit comprising spaced annular walls defining an annular chamber, said walls being formed of sectional parts, each of said walls being defined by axial and transverse portions with the transverse portions joined at their peripheries to the axial and transverse portions of adjacent sectional parts, said transverse portions being flexible to permit axial expansion of said annular chamber.

6. An expansible and contractible unit comprising spaced annular walls defining an annular chamber, said walls consisting of a number of sectional parts constructed to form inwardly extending flexible elements whereby to permit expansion and contraction of said walls, the inwardly extending flexible elements of one wall overlapping the inwardly extending flexible elements of the other wall.

WALTER C. HASSELHORN.

REFERENCES CITED

The following references are of record in the file of this patent:

UNITED STATES PATENTS

| Number | Name | Date |
| --- | --- | --- |
| 1,195,133 | Dalen | Aug. 15, 1916 |
| 1,726,584 | Persons | Sept. 3, 1929 |
| 1,909,744 | Berg | May 16, 1933 |
| 2,071,583 | Shutt | Feb. 23, 1937 |
| 2,117,219 | Shaw | May 10, 1938 |
| 2,174,635 | Linderman | Oct. 3, 1939 |
| 2,233,132 | Hewell | Feb. 25, 1941 |
| 2,323,985 | Fausek | July 13, 1943 |